United States Patent [19]
Koch et al.

[11] 4,404,614
[45] Sep. 13, 1983

[54] SURGE ARRESTER HAVING A NON-FRAGMENTING OUTER HOUSING

[75] Inventors: Robert E. Koch, Pittsfield; Daniel D. Bergh, Lenox, both of Mass.

[73] Assignee: Electric Power Research Institute, Inc., Palo Alto, Calif.

[21] Appl. No.: 264,008

[22] Filed: May 15, 1981

[51] Int. Cl.³ .................................................. H02H 9/04

[52] U.S. Cl. .................................... 361/128; 361/126; 361/117; 315/36; 313/231.1

[58] Field of Search ............... 361/127, 126, 128, 130, 361/132, 117, 120; 313/220, 221, 317, 312, 231.1, 269, 281; 315/36; 338/21, 20; 29/592 R, 610; 174/179

[56] References Cited

U.S. PATENT DOCUMENTS

| | | | |
|---|---|---|---|
| 2,374,527 | 4/1945 | Earle | 361/128 X |
| 2,546,006 | 3/1951 | Leonard et al. | |
| 3,035,209 | 5/1962 | Smith, Jr. | 361/127 X |
| 3,214,634 | 10/1965 | Osmundsen et al. | 361/127 X |
| 3,727,108 | 4/1973 | Westrom | 361/127 |
| 4,028,656 | 6/1977 | Schmunk et al. | 174/179 X |
| 4,074,221 | 2/1978 | Milligan | 361/127 X |
| 4,100,588 | 7/1978 | Kresge | 361/127 |
| 4,161,012 | 7/1979 | Cunningham | 361/127 X |

*Primary Examiner*—Patrick R. Salce
*Attorney, Agent, or Firm*—Flehr, Hohbach, Test, Albritton & Herbert

[57] ABSTRACT

A surge arrester including an outer elongated housing and an inner liner is disclosed herein. The outer housing is constructed of a material which will not break as a result of internal electrical arcing, specifically a relatively resilient, electrically insulating and non-tracking material which in a preferred embodiment is EPDM rubber. In order to add structural integrity to the arrester, its inner liner is constructed of a high strength material, preferably resin impregnated fiberglass.

8 Claims, 2 Drawing Figures

SURGE ARRESTER HAVING A NON-FRAGMENTING OUTER HOUSING

The present invention relates generally to surge arresters and more particularly to a surge arrester including a non-fragmenting outer housing and internal components which upon failure can result in electrical arcing within the housing sufficient to increase the internal pressure and temperature of the arrester to levels which might otherwise cause the housing to break.

A typical surge arrester is one which includes (1) an outer elongated housing of relatively rigid electrically insulating material, usually porcelain because of its excellent non-tracking characteristics, (2) electrical terminals at opposite ends of the housing and (3) means including a number of arrester components located within the housing. These internal components provide a high or low electrical impedance path between the terminals depending upon the voltage across the latter. More specifically, if the surge arrester is subjected to an abnormally high voltage, for example lightning, it is designed to discharge a corresponding surge current between its terminals until the abnormal voltage is removed. Thereafter, a follow current is typically produced with the tendency to flow through the arrester. Under normal conditions, this follow current is interrupted by the arrester without damage to the latter because of the lower, normal voltage which is applied thereto at that time. However, occasionally the lightning or follow current flowing into the arrester causes block or gap damage such that a short circuit arc is established within. Under these circumstances, the heat and pressure from the electrical arcing can cause the arrester housing, especially a porcelain housing, to break unless this is prevented.

One way of preventing the arrester housing from breaking is suggested in U.S. Pat. No. 3,214,634 (Osmundsen, et al). This patent describes a drop-out device and a gas absorbing internal liner. However, there are other approaches which use pressure relief techniques such as the one disclosed in U.S. Pat. No. 4,100,588 (Kresge). Another approach is to quench the arc itself as in U.S. Pat. No. 2,546,006 (Leonard et al). In this latter reference, an inner tubular member capable of evolving gas is provided. As soon as an arc strikes in this arrester, a large quantity of relatively un-ionized gas is evolved from the tubular member. This gas mixes turbulently with the gases from the arc and is discharged in a blast in the direction of the arc for extinguishing the latter and deionizing the arc path. This device is an expulsion arrester which is currently obsolete partly because of its very limited capability to interrupt 60 Hz follow current.

Still another technique for preventing the housing of a surge arrester from breaking is to make the housing itself non-fragmenting which is the main object of the present invention.

Another object of the present invention is to provide a non-fragmenting housing in an uncomplicated, economical and yet reliable way.

In accordance with a more specific object of the present invention, the arrester disclosed herein is one including a housing which is sufficiently resilient so as not to be capable of breaking in response to and as a result of abnormal increases in internal pressure and/or temperature.

Still another specific object of the present invention is to provide an arrester including a resilient non-fragmenting outer housing and yet an arrester which displays sufficient structural rigidity and moisture resistance to protect its internal components.

The surge arrester disclosed herein is one which includes an outer elongated housing defining an internal chamber, terminals at opposite ends of the housing and means including a number of arrester components disposed within the housing chamber for providing a high or low electrical impedance path between the terminals, depending upon the voltage across the latter. In addition, in accordance with the present invention, the outer housing itself is constructed of a material which is sufficiently resilient to be non-fragmenting, as stated above. This material must of course also be of a non-tracking type, that is, it must be incapable of supporting carbon buildup on the outer surface which might otherwise short circuit the arrester. In a preferred embodiment, the resilient material is molded highly filled (EPDM) rubber. In order to add structural integrity to the arrester for protecting its internal components, an inner liner which is rigid or of high flexural strength is located concentrically between these components and the inner surface of the outer housing. In a preferred embodiment, this inner liner is constructed of resin impregnated fiberglass.

BRIEF DESCRIPTION OF THE DRAWINGS

The specific arrester disclosed herein and designed in accordance with a preferred embodiment of the present invention will be described in more detail hereinafter in conjunction with FIG. 1 which illustrates the arrester partially in perspective view and partially in axial section.

Turning specifically to FIG. 1, the surge arrester shown there is generally designated by the reference numeral 10. This arrester includes an outer elongated housing 12 which is opened at opposite ends and which defines a longitudinally extending chamber 14. Chamber 14 is sealed at its opposite ends by a closure arrangement 16 which also serves as a line terminal and a closure arrangement 18 which serves as a ground terminal.

Figure 1:
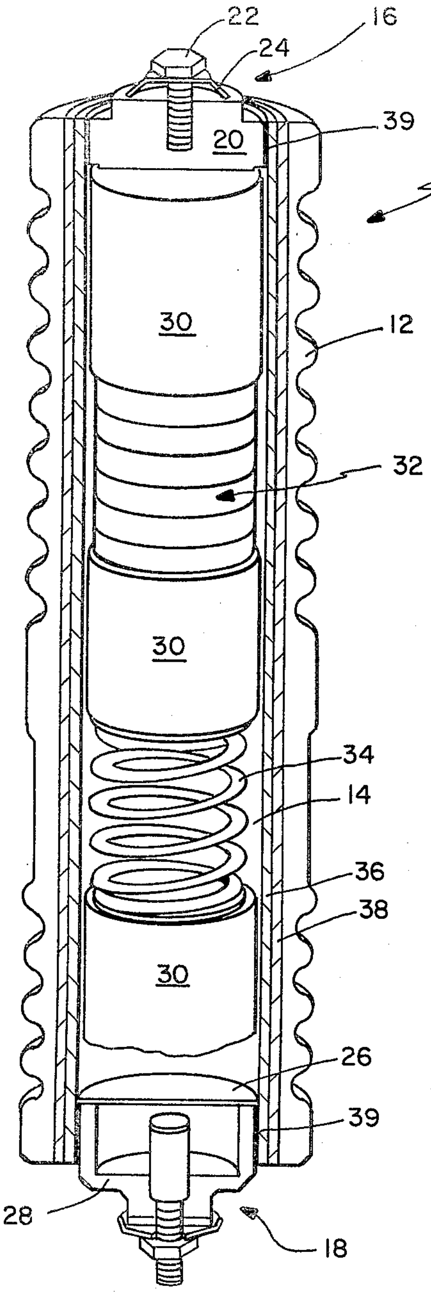
As seen in FIG. 1, closure arrangement 16 includes an electrically conductive plug 20 located concentrically within one end section of housing 12 and a suitable line connecting mechanism including for example bolt 22 and its associated washer 24. On the other hand, closure arrangement 18 is comprised of a suitable pressure relief diaphragm 26 and an associated ground lead disconnector generally indicated at 28. In this way, the closure arrangement 18 not only serves to close the bottom end of chamber 14 and as a ground terminal but also as a pressure relief valve. The overall surge arrester could be provided with a second closure arrangement 18, that is, one which serves as a pressure relief valve, in place of arrangement 16. In this case, the second arrangement 18 would serve as a line terminal rather than a ground terminal.

Chamber 14 contains suitable and readily providable means including a plurality of arrester components for providing a high or low electrical impedance path between terminal arrangements 16 and 18, depending upon the voltage across these terminals. More specifically, these components which include, for example, a number of THYRITE valve elements 30, a gap assembly generally indicated at 32, and a loading spring 34 serve to provide a high impedance path between terminal arrangements 16 and 18 under normal voltage conditions, that is, so long as the potential between the two terminal arrangements remains at or below the normal operating potential for which the surge arrester is designed. However, should the arrester be subjected to an abnormally high surge voltage, for example lightning, the components within chamber 14 provide a low impedance path to ground for the passage of surge current thereto.

While the operating components within arrester chamber 14 have been shown to include the valve elements 30, the gap assembly 32 and loading spring 34, it is to be understood that surge arrester 10 is not limited to these particular components but may use any other suitable means for accomplishing the same end. However, it is to be understood that while these components are provided for the purpose of functioning in the manner described, they may malfunction as discussed previously, thereby resulting in electrical arcing between components within chamber 14 which, in turn, generates heat and increases pressure therein. As will be seen hereinafter, surge arrester 10 is specifically designed to be non-fragmenting even though internal pressure and/or increases in internal temperature may be present to a degree sufficient to cause a porcelain or like housing to break.

In accordance with the present invention, arrester 10 is made non-fragmenting by making its housing 12 non-fragmenting. This is accomplished by utilizing a relatively resilient non-tracking elastomeric material for housing 12, preferably highly filled molded EPDM rubber or butyl rubber. The fill is preferably hydrated alumina. A specific suitable composition may also be found in U.S. Pat. No. 3,657,469, reference being made thereto. The actual material described there (which may be suitable as the housing) is peroxide cured ethylene propylene terpolymer which has a 20 to 70% (by weight) filler of alumina trihydrate. For best arc track resistance the amount of alumina should be in the maximum range. Should the surge arrester fail in a way which causes internal electrical arcing sufficient to increase the pressure and/or temperature within chamber 14 and should closure arrangement 18 fail to relieve the internal pressure rapidly enough, housing 12 might expand and even delaminate but because of its resilient nature it will not break into pieces.

In a preferred embodiment of the present invention, surge arrester 10 is provided with both structural integrity and moisture resistance to protect its internal components. More specifically, as illustrated in FIG. 1, the arrester is shown including an inner tubular liner 36 disposed concentrically within and extending the entire length of chamber 14 between the internal components of the latter and the inner surface of housing 12. This liner is constructed of a material having high bursting strength, preferably resin impregnated fiberglass (specifically epoxy resin impregnated filament wound fiberglass). An intermediate sleeve 38 is disposed concentrically between an extends the entire length of liner 36 and the inner surface of housing 12. This sleeve is constructed of a moisture impervious material, preferably glass flakes in an epoxy matrix. In a preferred embodiment, the glass flakes have an aspect ratio in the order of 1000:1 in the epoxy matrix. The innermost liner 36 adds structural integrity to the overall arrester, and intermediate sleeve 38 serves as a moisture barrier. Additional barriers are provided between the closure arrangements 16 and 18 and the end sections of innermost liner 36 in the form of bonding layers 39. These layers also serve to maintain the closure arrangements fixedly attached in position within housing 12 as shown. The bonding material may be of any suitable type such as a high strength structural epoxy adhesive.

While it may be desirable to provide surge arrester 10 with structural integrity in the form of inner rigid liner 36, it is to be understood that a surge arrester could be designed in accordance with the present invention without a rigid liner. More specifically, the arrester could be one which has a non-fragmenting outermost housing similar to housing 12 but without innermost liner 36. A surge arrester of this type is illustrated (in part) in FIG. 2 at 40. As seen there, the arrester includes a housing 42 which may be constructed of the same material as housing 12, that is, a highly filled molded EPDM rubber or butyl rubber in a preferred embodiment. A chamber 44 is provided by housing 42 and may include the same internal components as chamber 14. However, the space between these components and the inner surface of housing 42 may remain empty or may include a moisture barrier similar or identical to intermediate sleeve 38, although such a barrier is not shown in FIG. 2.

Figure 2:
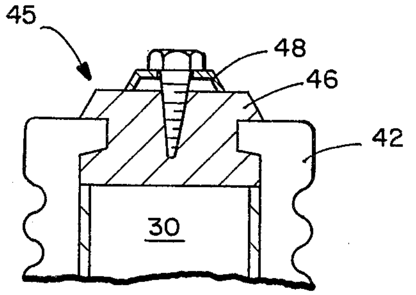
FIG. 2 illustrates the top sectional view of an arrester designed in accordance with a second embodiment of the present invention.

The opposite ends of chamber 44 are closed by closure arrangements, only the top one of which is illustrated in FIG. 2. This top arrangement generally indicated at 45 serves as a line terminal in the same manner as arrangement 16 and accordingly includes an electrically conductive plug 46 and associated line connecting mechanism 48. The plug 46 and housing 42 are preferably mechanically interlocked to one another in the manner shown. More specifically, the plug itself includes a circumferential groove for receiving a radially inwardly extending end section of housing 42. The other closure arrangement comprising part of arrester 40 may be similar to previously described arrangement 18 to the extent that it serves as a ground terminal and also a pressure relief valve. However, this latter arrangement is preferably mechanically interlocked with housing 42 in the same manner as arrangement 40.

In assembling surge arrester 10, the various internal arrester components are relatively easily disposed within inner liner 36 which, in turn, is disposed within intermediate sleeve 38 or the latter is applied around the inner liner. This entire subassembly is readily provided concentrically within the resilient housing 12 or the latter is first located around the inner liner and the intermediate sleeve before the internal arrester components are provided. However, in the case of surge arrester 40, the various internal components are disposed within housing 42 by first expanding the latter with the aid of suitable means, for example a vacuum chamber. Once all of the internal components are so located, the vacuum is removed causing the rubber housing to shrink around its internal components. On the other hand, the outermost housing could be molded in place around the internal components.

What is claimed is:

1. A surge arrester comprising: an outer elongated housing of relatively resilient, electrically insulating and non-tracking material defining a longitudinal chamber extending from one end of the housing to an opposite end thereof; first and second chamber closing means respectively including electrical terminals located at said chamber ends; means including a plurality of arrester components in series relationship with one another within said housing chamber for providing a high or low electrical impedance path between said terminals depending upon the voltage across the latter; a high flexural strength thermal insulating inner liner disposed between said arrester components and the inner surface of said housing; and an intermediate moisture impervious liner constructed of glass flakes in epoxy resin between said inner liner and said elongated housing.

2. A surge arrester according to claim 1 including pressure relief means forming part of at least one of said chamber closing means for opening an associated end of said chamber to the ambient surroundings and thereby venting said chamber in response to a predetermined increase in pressure within the latter.

3. A surge arrester according to claim 1 wherein said outer housing is constructed of non-tracking EPDM rubber.

4. A surge arrester according to claim 1 wherein said intermediate liner is substantially weaker structurally than said inner liner.

5. A surge arrester according to claim 1 wherein said intermediate liner includes said glass flakes with an aspect ratio in the order of 1000:1 in said epoxy matrix.

6. A surge arrester according to claim 1 wherein said inner liner is formed from resin impregnated fiberglass.

7. A surge arrester comprising: an outer elongated housing of resilient non-tracking rubber defining a longitudinal chamber from one end of the housing to an opposite end thereof; first and second chamber closing means respectively including electrical terminals located at said chamber ends; means including a plurality of arrester components in series relationship with one another within said housing chamber for providing a high or low electrical impedance path between said terminals depending upon the voltage across the latter; an inner thermal insulating liner constructed of high flexural strength resin impregnated fiberglass, said liner being located between said arrester components and the inner surface of said housing; an intermediate moisture impervious liner constructed of glass flakes in an epoxy matrix located between said inner liner and the inner surface of said housing; and pressure relief means forming part of at least one of said chamber closing means for opening an associated end of said chamber to the ambient surroundings to thereby vent said chamber in response to a predetermined increase in pressure within the latter.

8. A surge arrester according to claim 7 wherein said rubber is hydrated alumina filled EPDM rubber.

* * * * *